(12) United States Patent
Di Blas et al.

(10) Patent No.: US 9,811,560 B2
(45) Date of Patent: Nov. 7, 2017

(54) VERSION CONTROL BASED ON A DUAL-RANGE VALIDITY MODEL

(71) Applicant: Oracle International Corporation, Redwood Shores, CA (US)

(72) Inventors: Andrea Di Blas, Irvine, CA (US); Benjamin Schlegel, Redwood City, CA (US); Sam Idicula, Santa Clara, CA (US); Sabina Petride, Tracy, CA (US); Kantikiran Pasupuleti, Foster City, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 335 days.

(21) Appl. No.: 14/824,920

(22) Filed: Aug. 12, 2015

(65) Prior Publication Data

US 2017/0046384 A1 Feb. 16, 2017

(51) Int. Cl.
*G06F 7/00* (2006.01)
*G06F 17/30* (2006.01)

(52) U.S. Cl.
CPC .. *G06F 17/30448* (2013.01); *G06F 17/30345* (2013.01); *G06F 17/30353* (2013.01)

(58) Field of Classification Search
CPC ................................................ G06F 17/30353
See application file for complete search history.

(56) References Cited

PUBLICATIONS

R. Rantzau et al., Champagne: data change propagation for heterogeneous information systems. In Proceedings of the 28th 28th international conference on Very Large Data Bases pp. 1099{1102, 2002.
J. Krueger et al., Fast updates on read-optimized databases using multi-core CPUs. Proceedings of the VLDB Endowment, 5(1), pp. 61{72, 2011.
H. Plattner and A. Zeier. In-memory data management. Springer, 2011, 43 pages.
A. Kemper and T. Neumann. Hyper: A hybrid OLTP&OLAP main memory database system based on virtual memory snapshots. In IEEE 27th Int. Conference on Data Engineering, IEEE, 2011, pp. 195-206.
F. Farber, N. May, W. Lehner, P. Gro_e, I. Muller, H. Rauhe, and J. Dees. The SAP HANA database { an architecture overview. IEEE Data Eng. Bull., 35(1), pp. 28{33, dated 2012.

*Primary Examiner* — Ajith Jacob
(74) *Attorney, Agent, or Firm* — Hickman Palermo Becker Bingham LLP

(57) ABSTRACT

Techniques related to version control based on a dual-range validity model are disclosed. In an embodiment, an online analytical processing (OLAP) server stores a plurality of version records describing versions of a data item. A version record may describe any open transactions for a version of the data item. The version record may specify a commit timestamp for the data item at a database and a valid timestamp at least as great as the commit timestamp. The commit timestamp and the valid timestamp may specify a validity range. The version record may also specify an expiration timestamp, which along with the valid timestamp may specify an unresolved range. The OLAP server may also identify a valid version of the data item for a query timestamp that corresponds to a query for particular data in the data item and that falls within either the validity range or the unresolved range.

20 Claims, 9 Drawing Sheets

VERSION CONTROL BASED ON A DUAL-RANGE VALIDITY MODEL

FIELD OF THE DISCLOSURE

Embodiments relate to information retrieval technology and more specifically, to version control based on a dual-range validity model.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data storage and retrieval systems often include two parts. Typically, the two parts are a transactional front-end that processes changes to stored data and an analytical back-end that analyzes the stored data, for example, when a query is executed. FIG. 1 depicts an example computer architecture. Referring to FIG. 1, client computers 100 and 102 are communicatively coupled to online transaction processing (OLTP) server 104 and online analytical processing (OLAP) server 106.

OLTP server 104 may be optimized to handle concurrent changes from multiple client computers 100 and 102. The changes may be implemented based on one or more instructions that may be processed as a single logical operation called a transaction. For example, Structured Query Language (SQL) commands "INSERT", "UPDATE", and "DELETE" may each be processed as a single transaction. Data related to a transaction may be persisted when a "commit" operation is performed on the transaction. A transaction that fails to be "committed" (e.g., due to an error) may undergo a "rollback" operation that restores data to a previous version.

OLAP server 106 may be optimized to run complex, long-running queries. To avoid computational costs associated with constantly accessing data from OLTP server 104, OLAP server 106 may periodically replicate data stored by OLTP server 104 and execute a query on the replicated data. For example, whenever OLTP server 104 processes a change to a database table, the entire table may be replicated by OLAP server 106. However, frequently loading entire tables may disturb the execution of any running queries. Alternatively, after loading all data once, OLAP server 106 may retrieve each change to the data as it occurs in OLTP server 104. However, some of the changes may be unnecessary for the execution of any query. As a result, excess data replication may senselessly increase latency and/or the need for larger memory systems. Thus, approaches for efficiently retrieving up-to-date data on an "as-needed" basis are desirable and beneficial.

DETAILED DESCRIPTION

Figure 1:
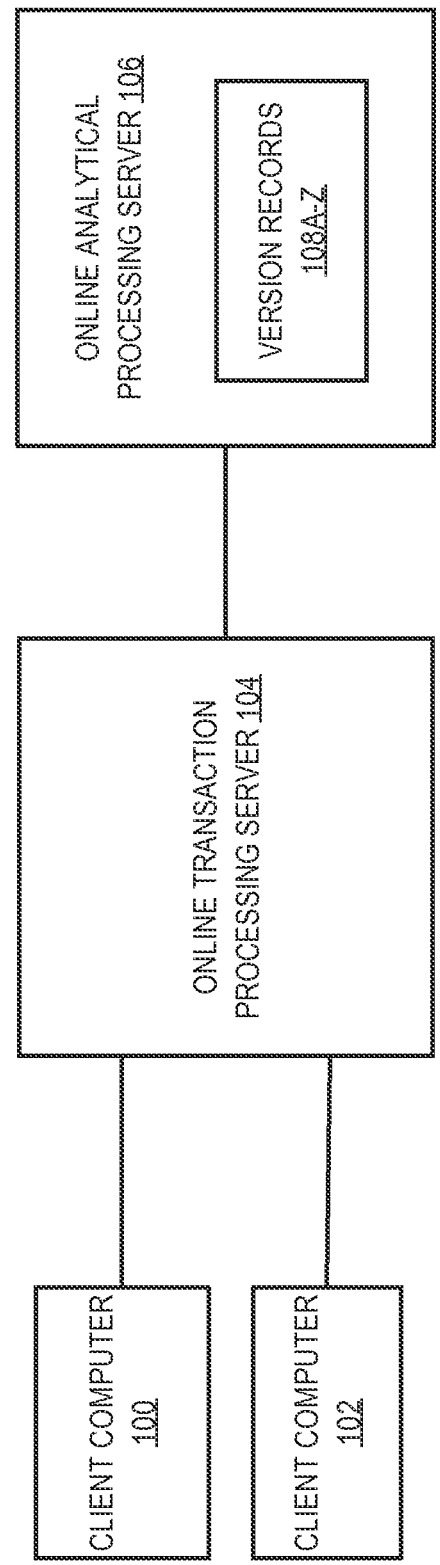
FIG. 1 depicts an example computer architecture on which embodiments may be implemented.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order. For example, a second server may be so named although, in reality, it may correspond to a first, second, and/or third server.

General Overview

In an embodiment, a database table in OLTP server 104 may be loaded in its entirety into OLAP server 106 when OLAP server 106 receives a query to be executed on the database table for the first time. Subsequently, portions of the database table may be loaded into OLAP server 106 individually when necessary for executing other queries. Multiple versions of data may result from subsequent changes to the data, and each version may be valid for a different time period. Thus, loading a particular version may be necessary when it is unknown, to OLAP server 106, which of the multiple versions is valid at a particular time for a particular query.

Determining which of the multiple versions is valid at the particular time for the particular query may involve analyzing version metadata. For a particular version, the version metadata may include a commit timestamp, a valid timestamp, and a set of any open transactions. The commit timestamp of the particular version may correspond to a time when the particular version was persisted. Thus, if the particular time precedes the commit timestamp of the particular version, the particular version may be determined invalid for the particular time. The valid timestamp of the particular version may correspond to a last known time of validity for the particular version from the perspective of OLAP server 106. The commit timestamp and the valid timestamp may demarcate a validity range of the particular version that includes all the points in time when the particular version is known to be valid by OLAP server 106. However, even if the particular time falls within the validity range of the particular version, the particular version may be determined invalid for the particular query depending on whether the particular query is involved in any open transactions of the particular version. Open transactions of the particular version may refer to any changes to the particular version that are pending during the time period marked by the validity range. Thus, if the particular query is uninvolved in any open transactions for the particular version, the particular version may be determined valid for the particular time. However, if the particular query is involved in any open transactions for the particular version, OLAP server 106 may request from OLTP server 104 a valid version for the particular time and the particular query.

If the particular version has been superseded by a newer version that is known to OLAP server 106, the version metadata associated with the particular version may also include an expiration timestamp. The expiration timestamp of the particular version may correspond to a time when the newer version was persisted. Thus, if the particular time follows the expiration timestamp of the particular version, the particular version may be determined invalid for the particular time. The valid timestamp and the expiration timestamp may demarcate an unresolved range of the particular version that includes all the points in time when the particular version is neither known to be valid nor known to be invalid by OLAP server 106. Thus, if the particular time falls within the unresolved range of the particular version, OLAP server 106 may request from OLTP server 104 a valid version for the particular time and the particular query. The valid version may be the particular version or another version.

Example Version Record

The first time at least a portion of a query is to be executed on a particular data set (e.g., a particular database table), the particular data set in its entirety may be retrieved from OLTP server 104. For example, a database may include multiple database tables. Thus, when a particular database table is involved in at least a portion of a query for the first time, the particular database table may be loaded in its entirety into OLAP server 106. Hereinafter, a query may refer to a portion of a query and/or a query in its entirety.

In an embodiment, the particular data set may be divided into multiple subunits called data blocks that are each retrieved concurrently from OLTP server 104. Each data block may correspond to one or more data items in the particular data set. Each data block may also correspond to a particular version of the one or more data items at a given point in time.

To efficiently determine which data block is valid for a particular query, OLAP server 106 may maintain version metadata called version records 108A-Z in FIG. 1. Each data block may be an atomic unit of data associated with a single version record. For example, each data block may correspond to a particular number of rows in a database table that share a same version record at a given point in time. Each of version records 108A-Z may store a temporal stamp that is used to determine whether a particular data block is valid for a particular query.

Figure 2:
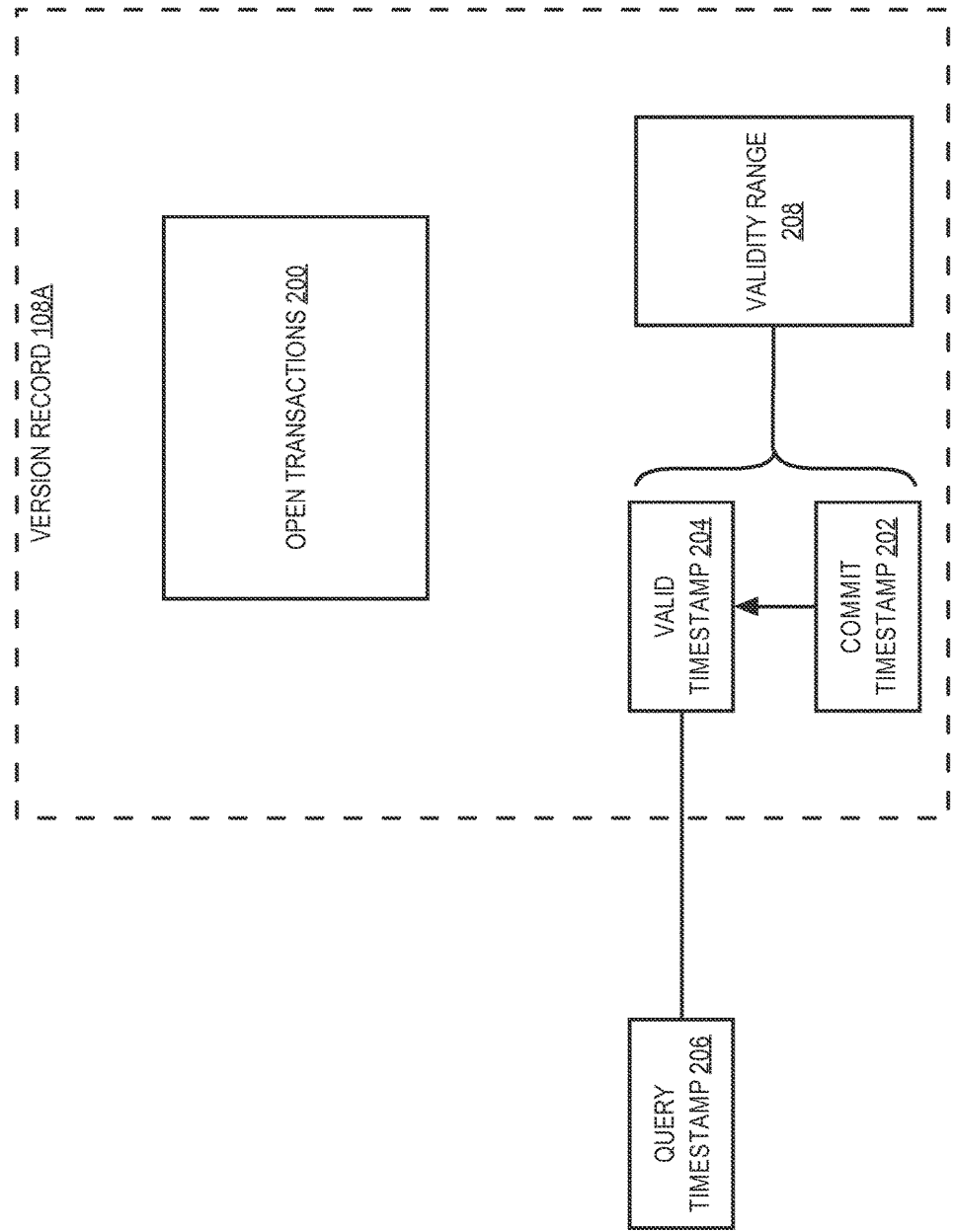
FIG. 2 depicts a detailed view of a version record, in an example embodiment.

FIG. 2 depicts a detailed view of a version record, in an example embodiment.

Referring to FIG. 2, version record 108A includes open transactions 200, commit timestamp 202, and valid timestamp 204, which corresponds to query timestamp 206. Validity range 208 includes commit timestamp 202 and valid timestamp 204.

Each of version records 108A-Z may store version metadata corresponding to a particular version of one or more data items. The version metadata may include information (e.g., open transactions 200, commit timestamp 202) provided by OLTP server 104 to OLAP server 106 as well as information generated and/or maintained by OLAP server 106 (e.g., valid timestamp 204, expiration timestamp 404). In an embodiment, the version metadata may also indicate a quantity of data (e.g., a number of rows, a number of columns) stored in a particular data block. The quantity of data that is stored may differ from data block to data block.

Open transactions 200 may reference a set of transactions that were pending for a particular data block when the particular data block was retrieved from OLTP server 104. If no transactions were pending, open transactions 200 may not reference anything. The set of transactions may be referenced by one or more alphanumeric identifiers called transaction identifiers. For example, open transactions 200 may indicate that transaction "A1" was started but remained uncommitted when a data block associated with version record 108A was loaded into OLAP server 106. When a transaction involved in a particular query matches a transaction identifier stored in open transactions 200, a transaction-private version of the data block may be retrieved. For example, when a query involves data described in open transactions 200, a special request for the data may be sent to OLTP server 104.

In an embodiment, a temporal stamp may be a logical timestamp. The logical timestamp may start at a value of "0" and increment as time progresses. For example, when a database is initialized, a logical timestamp may indicate a value of "0"; when OLAP server 106 retrieves a database table from OLTP server 104, a logical timestamp may indicate a value of "15"; and when OLAP server 106 retrieves a particular row in the database table that has been modified, a logical timestamp may indicate a value of "25".

Commit timestamp 202 may be a temporal stamp that marks a point in time when one or more data items corresponding to a particular data block were persisted. In the example of FIG. 2, commit timestamp 202 may indicate a point in time when a data block associated with version record 108A became valid.

Valid timestamp 204 may be a temporal stamp that is generated and/or maintained by OLAP server 106. Valid timestamp 204 may mark a most recent time when a valid version of a particular data block was retrieved from OLTP server 104. The valid version may be retrieved in response to a query that involves the particular data block. For example, when a database table is loaded in its entirety for the first time, valid timestamp 204 may correspond to a time when the database table is loaded. In this example, version record 108A may have valid timestamp 204 unless open transactions 200 references one or more pending transactions for a data block corresponding to version record 108A. Due to the one or more pending transactions, a possibility of the data block being invalid may remain.

Query timestamp 206 may be a temporal stamp that marks a point in time corresponding to a particular state of a machine that stores the particular data set on which a particular query is to be executed. In the example of FIG. 2, query timestamp 206 corresponds to a time when a data block associated with version record 108A is retrieved. In FIG. 2, query timestamp 206 corresponds to valid timestamp 204, because query timestamp 206 corresponds to the most recent retrieval of the data block associated with version record 108A.

Validity range 208 may indicate a time period during which a particular data block is known to be a valid version. Validity range 208 may include any time between commit timestamp 202 and valid timestamp 204, inclusive. If query timestamp 206 corresponds to a query at a time that falls within validity range 208 for a particular version, the particular version may be valid for the query unless the query involves data related to open transactions 200. Thus, validity range 208 may consist of commit timestamp 202 for a version record with open transactions 200 referencing pending transactions.

Approach for Extending a Validity Range

In an embodiment, a validity range may be extended for a version record so long as the version record is unassociated with any pending transactions. For example, when a database table is loaded in its entirety for the first time, a validity range consisting of a commit timestamp may be extended to include a valid timestamp corresponding to a time when the database table is loaded. A validity range may also be extended by moving, in effect, the valid timestamp to correspond with a query that caused a subsequent retrieval of a data item that is identical to a previously retrieved data item. For example, after a first query causes a database table including a particular data item to be loaded, a second query may cause the particular data item to be retrieved again. If a value of the particular data item remains the same, a validity range for the particular data item may be extended.

Figure 3:
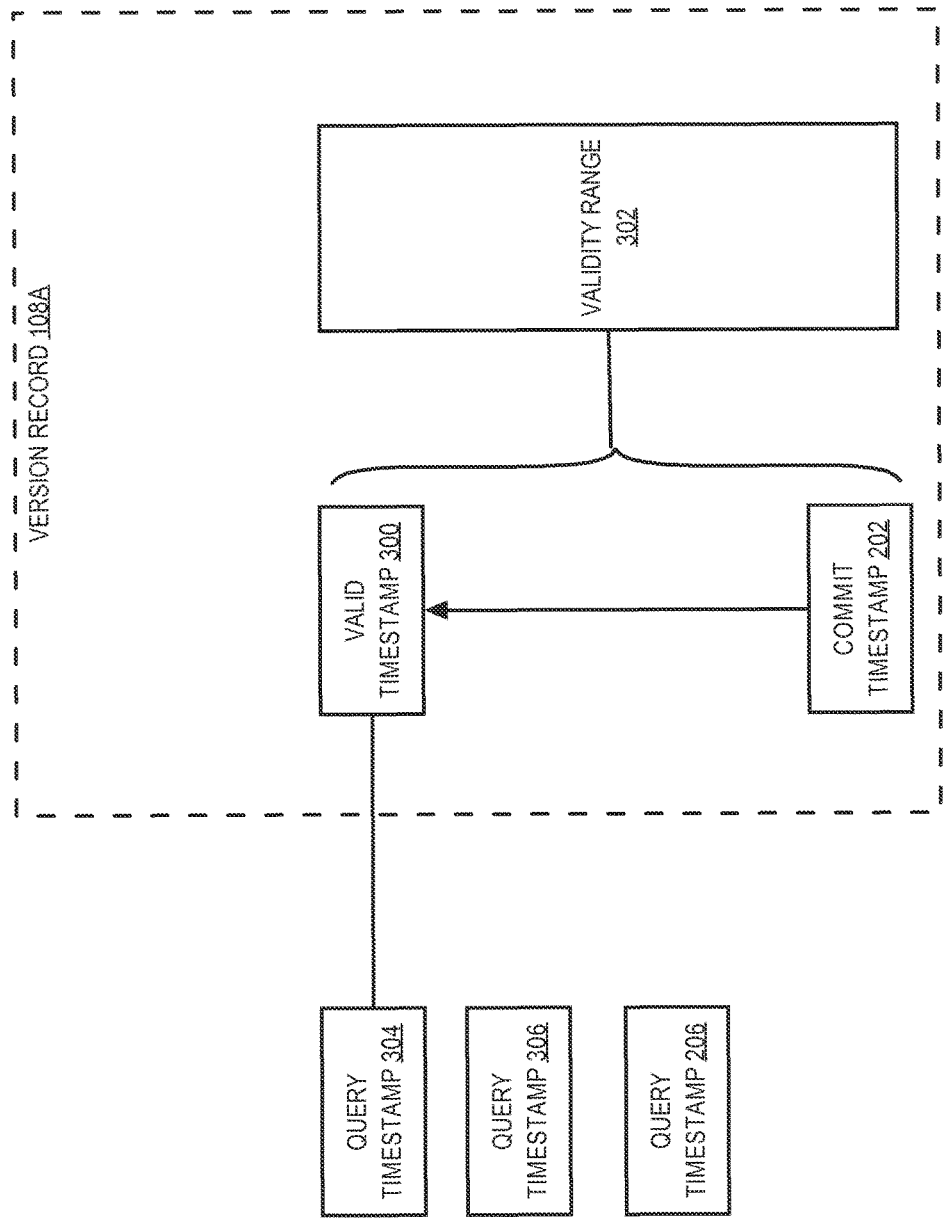
FIG. 3 depicts an example approach for extending a validity range.

FIG. 3 depicts an example approach for extending a validity range 208. Referring to FIG. 3, version record 108A includes commit timestamp 202 and valid timestamp 300, which corresponds to query timestamp 304. Validity range 302 includes query timestamps 206, 304, and 306.

Query timestamp 206 marks where valid timestamp 204 was located in FIG. 2. Subsequently, a query corresponding to query timestamp 304 was received. Since query timestamp 304 fell outside validity range 208 of FIG. 2, a valid version corresponding to query timestamp 304 was retrieved from OLTP server 104. In the example of FIG. 3, the valid version is identical to the version retrieved at query timestamp 206, so the valid version corresponds to version record 108A. In FIG. 3, query timestamp 304 marks the most recent time the data block corresponding to version record 108A was retrieved. Thus, valid timestamp 300 corresponds to query timestamp 304, thereby extending validity range 208 to validity range 302.

In the example of FIG. 3, query timestamp 306 indicates a point in time corresponding to another query to be executed on the data block. However, query timestamp 306 falls within validity range 302. OLAP server 106 already has a copy of the valid version, so it is unnecessary to retrieve data from OLTP server 104. Furthermore, valid timestamp 300 and validity range 302 remain unchanged by query timestamp 306.

Validity ranges may also be extended when a new query to be executed on the particular data set is received. When a new query is received, a buffer cache of OLTP server 104 may be fully flushed. Thus, OLAP server 106 may retrieve any data blocks with changes that are unknown to the second component. Thus, valid timestamps for the data blocks that are retrieved in response to the new query may be equivalent and may extend existing validity ranges for the data blocks to be more than a single point in time (e.g., commit timstamps). Furthermore, valid timestamps for any data blocks that are not retrieved in response to the new query may also be equivalent and extend existing validity ranges, because the data blocks must still be valid. Thus, all data blocks in the particular data set may have equivalent valid timestamps corresponding to a point in time for the new query.

Example Unresolved Range

Figure 4:
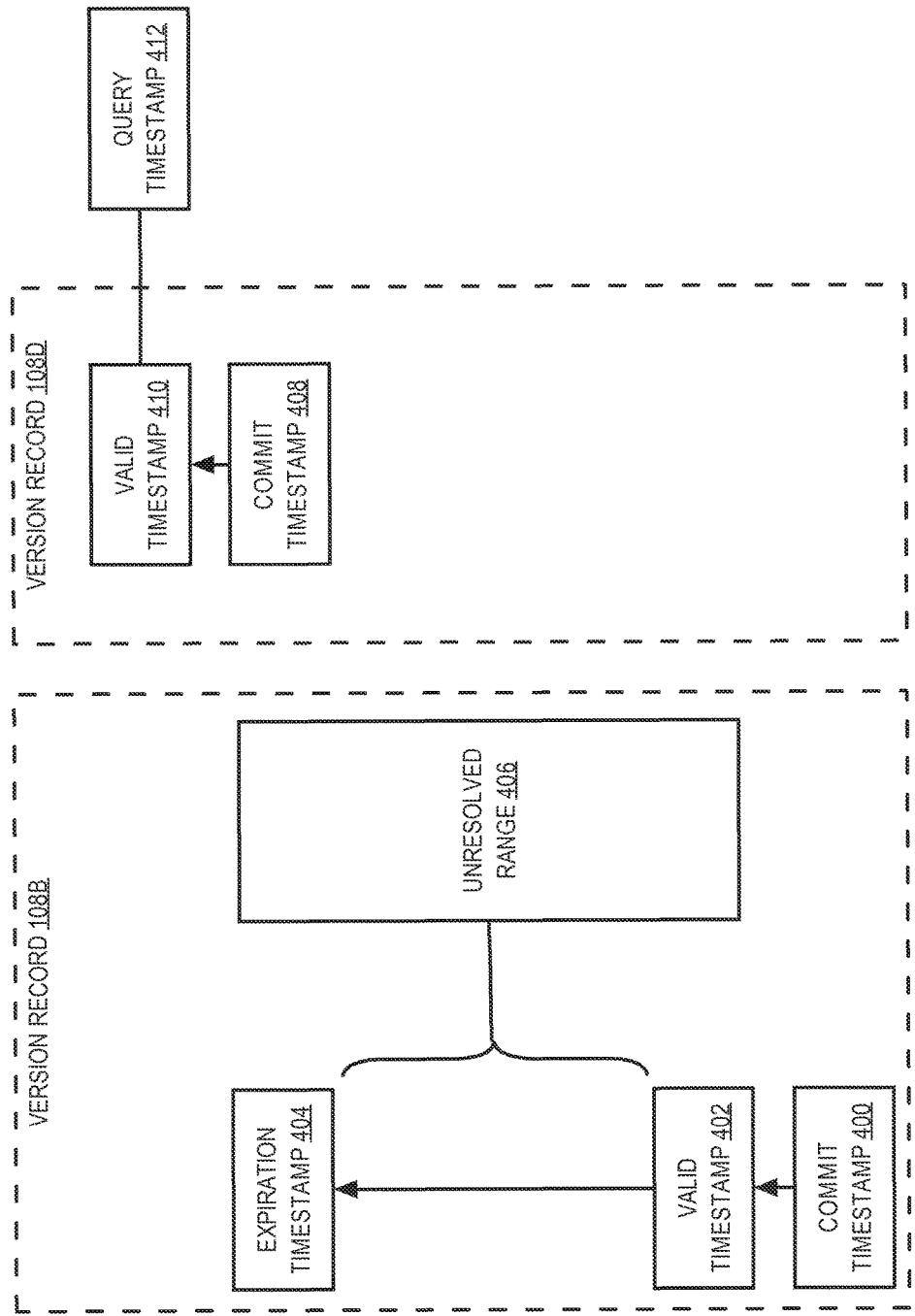
FIG. 4 depicts an example unresolved range.

OLAP server 106 may also generate and/or maintain a temporal stamp corresponding to a point in time when a particular version of a data item is known to be invalid. A time period between this point in time and a valid timestamp corresponds to an unresolved range during which time it is uncertain whether the particular version is valid. FIG. 4 depicts an example unresolved range. Referring to FIG. 4, version record 108B includes commit timestamp 400, valid timestamp 402, and expiration timestamp 404. Unresolved range 406 is marked by valid timestamp 402 and expiration timestamp 404. Version record 108D includes commit timestamp 408 and valid timestamp 410, which corresponds to query timestamp 412.

In FIG. 4, version record 108B corresponded to a current version (e.g., a version that was most recently retrieved from OLTP server 104) of a data item until version record 108D was generated for the same data item. Thus, prior to the generation of version record 108D, version record 108B did not include expiration timestamp 404 and unresolved range 406. Version record 108D is caused to be generated by query timestamp 412, which falls outside a validity range for version record 108B.

However, the generation of version record 108D indicates that the data item corresponding to version record 108B has been updated. For example, version record 108B may correspond to a time period during which a value of the data item is "CAT", and version record 108D may correspond to a time period during which that value becomes "DOG". Thus, commit timestamp 408 of version record 108D marks the beginning of a time period during which OLAP server 106 knows that the data item corresponding to version record 108B is no longer valid.

OLAP server 106 may generate and/or maintain expiration timestamp 404 for version record 108B. Expiration timestamp 404 may mark an earliest point in time at which OLAP server 106 knows that a particular version of a data item has been superceded by another version of the data item. In FIG. 4, expiration timestamp 404 of version record 108B corresponds to commit timestamp 408 of version record 108D. As will be described in FIG. 5, commit timestamp 408 does not necessarily correspond to a version that is immediately subsequent to the version corresponding to commit timestamp 400.

Unresolved range 406 may indicate a time period during which a particular data block could be but is not known to be a valid version. In FIG. 4, unresolved range 406 may include any time between valid timestamp 402 and expiration timestamp 404. If a query corresponds to a time that falls within unresolved range 406, OLAP server 106 may retrieve a valid version for the query. In FIG. 4, the valid version may correspond to version record 108B, version record 108D, or yet another version record.

Approach for Reducing an Unresolved Range

Figure 5:
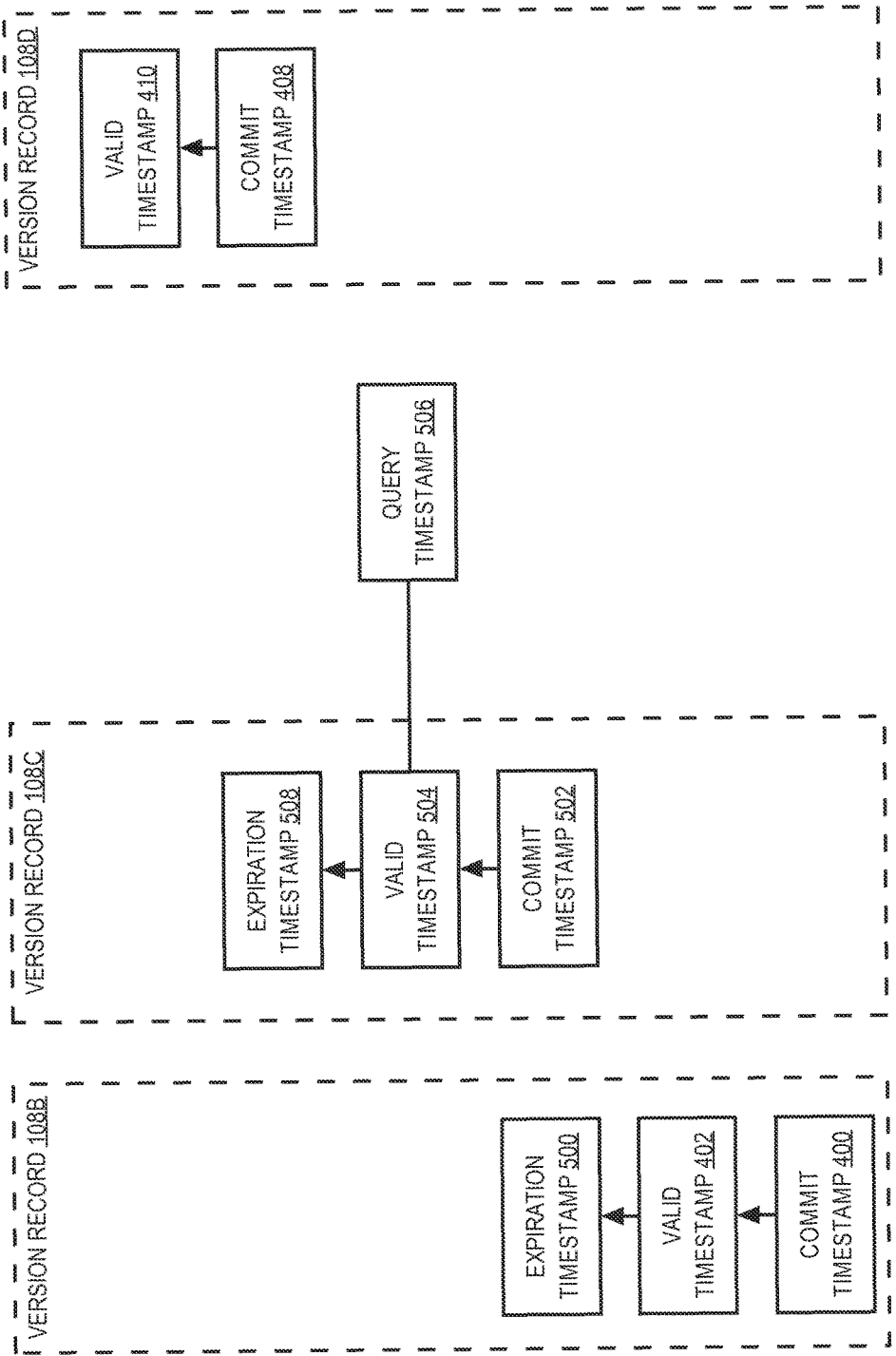
FIG. 5 depicts an example approach for reducing an unresolved range.

When a valid version for a query timestamp that falls within an unresolved range is a previously unknown version, the unresolved range may be reduced. Thus, an approach involving reducing unresolved ranges may avoid the computational overhead of continuously synchronizing OLTP server 104 and OLAP server 106. FIG. 5 depicts an example approach for reducing an unresolved range 406. Referring to FIG. 5, version record 108B includes commit timestamp 400, valid timestamp 402, and expiration timestamp 500. Version record 108C includes commit timestamp 502, valid timestamp 504, and expiration timestamp 508. Query timestamp 506 corresponds to valid timestamp 504. Version record 108D includes commit timestamp 408 and valid timestamp 410.

Query timestamp 506 fell within unresolved range 406 of FIG. 4. Thus, query timestamp 506 caused version record 108C to be generated when a valid version for query timestamp 506 was retrieved from OLTP server 104. In FIG. 5, the valid version corresponds to a previously unknown version that is an intermediate version between an older version corresponding to version record 108B and a current version corresponding to version record 108D. Thus, expiration timestamp 508 of version record 108C corresponds to commit timestamp 408 of version record 108D, and expiration timestamp 500 of version record 108B corresponds to commit timestamp of version record 108C.

Generation of version record 108C caused expiration timestamp 404 of FIG. 4 to be moved, in effect, to expiration timestamp 500 of FIG. 5, which is closer to valid timestamp 402. Thus, unresolved range 406 of FIG. 4 has been reduced to cover a shorter time period. The shorter time period corresponds to a smaller window of uncertainty regarding the validity of the older version corresponding to version record 108B. In an embodiment, generation of version record 108C may correspond to running a new query as of some point in the past, not to having a long-running query access superceded version records.

Example Optimization Based on a Current Version Mapping

Figure 6:
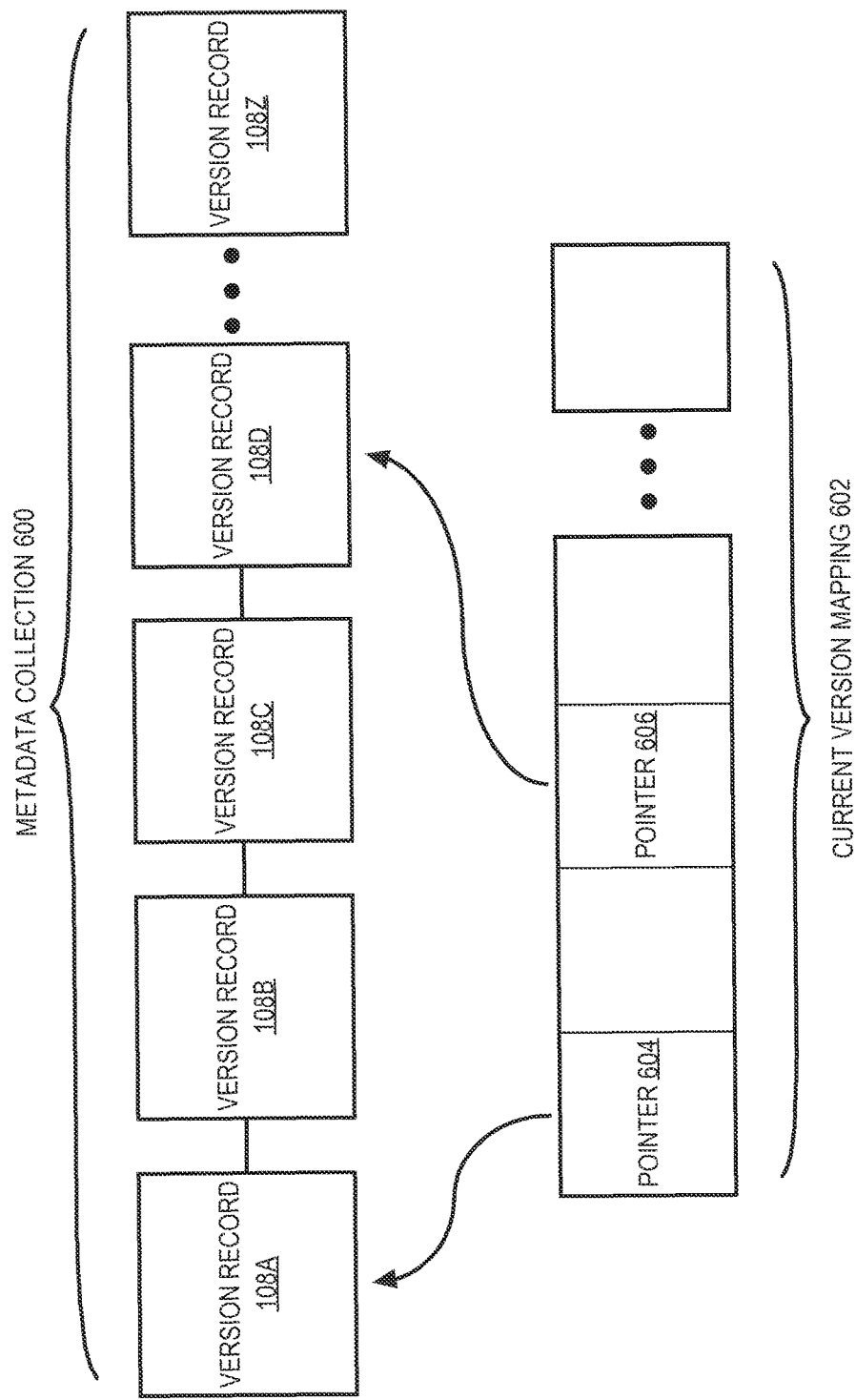
FIG. 6 depicts an example current version mapping.

In an embodiment, one or more data structures may be used to reduce a time complexity associated with locating one or more version records. To allow rapid scans of version records, the version records may be stored and/or maintained separately from data items that correspond to the version records. Typically, version records corresponding to current versions of data items are the most frequently accessed version records. Thus, references to version records of current versions may be stored and/or maintained as a current version mapping to enable the version records of the current versions to be accessed in constant time. FIG. 6 depicts an example current version mapping. Referring to FIG. 6, metadata collection 600 includes version records 108A-Z, and current version mapping 602 includes pointers 604 and 606. Pointer 604 references version record 108A, and pointer 606 references version record 108D.

Metadata collection 600 may store and/or maintain version records 108A-Z. Each element of metadata collection 600 may correspond to a different version record, including version records corresponding to current versions and non-current versions of data items. Metadata collection 600 may ensure read consistency based on maintaining a relative order of the elements in such a manner that the relative order remains unchanged while any queries are accessing a data set related to version records 108A-Z. Thus, elements may be removed from any point in metadata collection 600 and may be appended to metadata collection 600 without interfering with proper query execution.

Current version mapping 602 may store and/or maintain references to version records corresponding to current versions of data items. In FIG. 6, each element of current version mapping 602 is a pointer 604, 606. Current version mapping 602 may be indexed based on unique identifiers for the data blocks called block identifiers. The block identifiers may be generated by OLTP server 104. OLAP server 106 may use the block identifiers to refer to data blocks. Thus, current version mapping 602 may map block identifiers to memory locations of version metadata corresponding to the block identifiers.

Typically, a current version of a data item is accessed by a block identifier when a more recent version of the data block is retrieved. Based on current version mapping 602, version metadata corresponding to the current version is located in constant time. If the more recent version supercedes the current version, version metadata for the more recent version may be generated, and the version metadata corresponding to the current versions may be modified to reflect the existence of the more recent version. Note that any non-current versions remain unaffected by the existence of the more recent version.

Example Optimizations for Managing Data Storage

Figure 7:
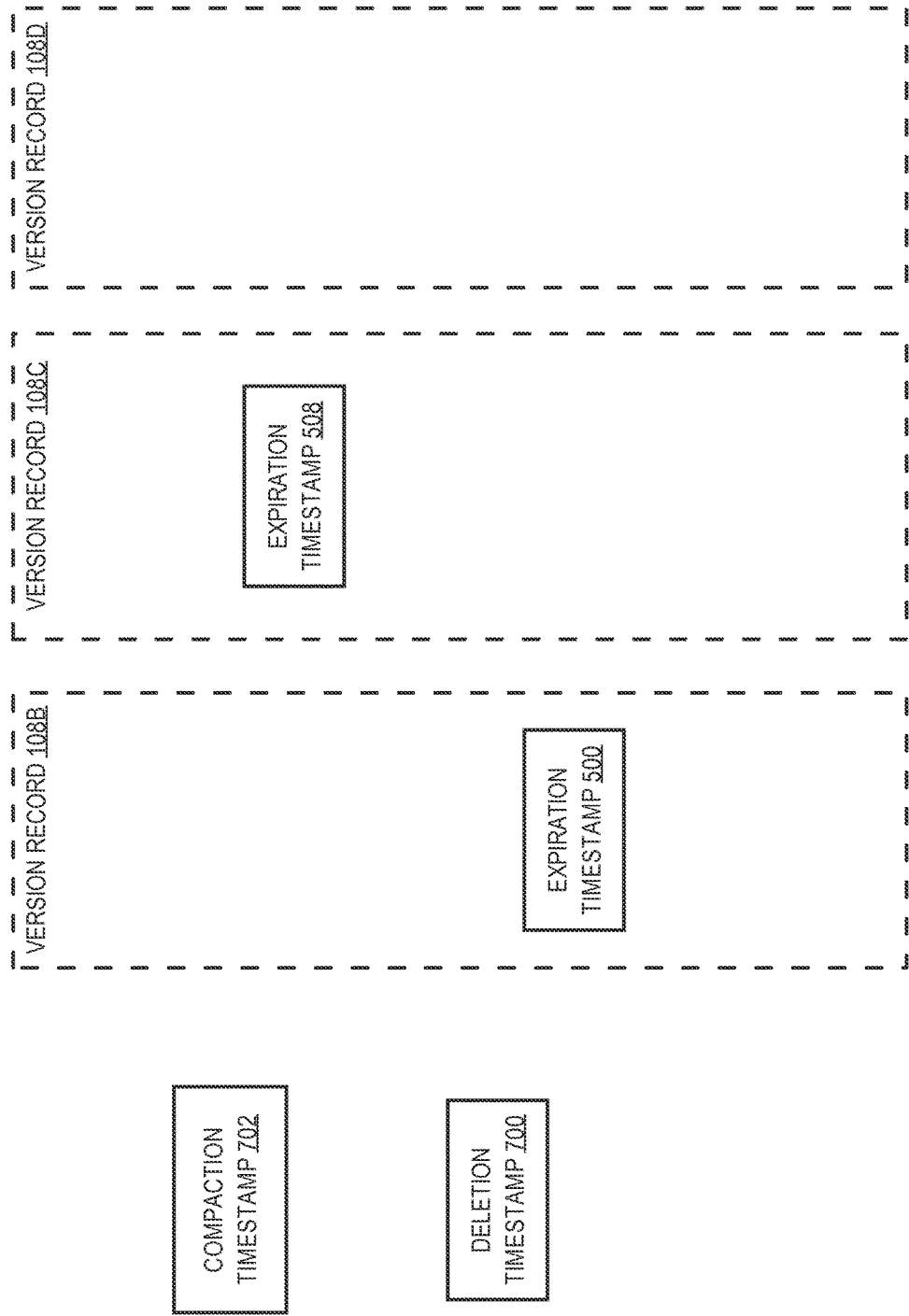
FIG. 7 depicts an example approach for managing data storage.

In an embodiment, memory usage may be reduced based on one or more policies for managing data storage. The one or more policies may include a deletion policy, a compression policy, a compaction policy, and/or a defragmentation policy. FIG. 7 depicts an example approach for managing data storage. Referring to FIG. 7, deletion timestamp 700 and compaction timestamp 702 are used to analyze version records 108B-D. Version record 108B includes expiration timestamp 500, and version record 108C includes expiration timestamp 508.

Data blocks may be stored separately from corresponding version metadata. The data blocks may be stored in a main store of OLAP server 106, and the corresponding version metadata may include references (e.g., pointers) to locations of the data blocks in the main store. Memory usage in the main store may be managed by periodically removing one or more data blocks based on a deletion policy. The deletion policy may include removing the one or more data blocks based on an age of each of the one or more data blocks. The age of a data block may be determined based on an expiration timestamp of the data block. Additionally or alternatively, the deletion policy may include removing the one or more data blocks based on whether the one or more data blocks are involved in any running queries.

In FIG. 7, the deletion policy causes removal of any data blocks corresponding to an expiration timestamp that is older than deletion timestamp 700. Deletion timestamp 700 may be determined based on any number of memory optimization strategies. For example, deletion timestamp 700 may be determined in such a manner that deletion timestamp 700 corresponds to a point in time that is older than a query timestamp corresponding to an oldest pending query. Determining deletion timestamp 700 in this manner may preserve an order in which data is accessed by a pending query. In other words, if data and metadata relevant to a particular pending query is deleted, the particular pending query may cause data to be re-fetched from OLTP server 104, thereby altering the order in which data was accessed previously by the particular pending query. Thus, deleting data and metadata for queries that are no longer pending may contribute to data read consistency. As will be described below, data read consistency may depend on maintaining the order in which data is accessed for each query. In an embodiment, deletion timestamp 700 may be the oldest pending query timestamp based on a survey of all pending queries. In another embodiment, deletion timestamp 700 may be the oldest pending query timestamp based on a subset of pending queries. For example, deletion timestamp 700 may correspond to the oldest pending query timestamp of a set of pending high priority queries, thereby allowing the pending high priority queries to run faster at the expense of older long-running queries. Metadata collection 600 may be scanned to identify any such data blocks. In FIG. 7, version record 108B includes expiration timestamp 500, which is older than deletion timestamp 700. Thus, a data block corresponding to version record 108B may be removed from the main store, and version record 108B may be removed from metadata collection 600. If a subsequent query involves a removed data block, a valid version for the subsequent query may be retrieved from OLTP server 104.

Additionally or alternatively, memory usage in the main store may be managed based on a compression policy. Multiple data blocks may be grouped into one or more data chunks, which are encoded and/or compressed prior to being appended to the main store. Since encoding and/or compressing a portion of a data chunk may be impossible, the multiple data blocks are stored, in an embodiment, in an auxiliary store to await being grouped into the one or more data chunks, which may be moved into the main store asynchronously. Data blocks in the auxiliary store may remain accessible to queries.

Additionally or alternatively, memory usage in the main store may be managed by periodically compacting data chunks based on a compaction policy. Typically, a data block occupies more memory space than its corresponding version metadata. Thus, removing a data block while maintaining its corresponding version metadata may free a considerable amount of memory. In an embodiment, the data chunks may be contiguous so that relative locations of data blocks remain unchanged to ensure consistency. Thus, removing data blocks from contiguous data chunks may allow queries to continue running consistently. The contiguous data chunks may be further compacted into a single data chunk when the contiguous data chunks are logically empty to a sufficient degree for compaction.

In FIG. 7, the compaction policy causes removal of any data blocks corresponding to an expiration timestamp that is older than compaction timestamp 702. Compaction timestamp 702 may be determined when more memory is needed than is available. Metadata collection 600 may be scanned to calculate how much memory would be freed by removing data blocks that have expiration timestamps and that are needed by the oldest, longest-running queries. Compaction timestamp 702 may be determined based on a tradeoff between freeing memory and increasing query run times due to potentially repeated retrievals of removed data blocks. In FIG. 7, version record 108C includes expiration timestamp 508, which is older than compaction timestamp 702. Thus, a data block corresponding to version record 108C may be removed from the main store, but version record 108C may be maintained in metadata collection 600.

However, compacting data chunks may interfere with a reading of a particular data set that includes the data chunks. Thus, unless a starting unit mapping (as discussed below) is used, compaction may be scheduled when it is the only process to access the main store and/or any other data structures related to managing the particular data set.

Additionally or alternatively, memory usage in the main store may be managed based on a defragmentation policy. Compacting data chunks of different sizes may result in memory fragmentation. When a particular data set reaches a predetermined level of fragmentation, the defragmentation policy may cause relative locations of data blocks to be rearranged. Thus, the particular data set may be completely rebuilt when no queries are accessing the particular data set.

Process Overview

Figure 8:
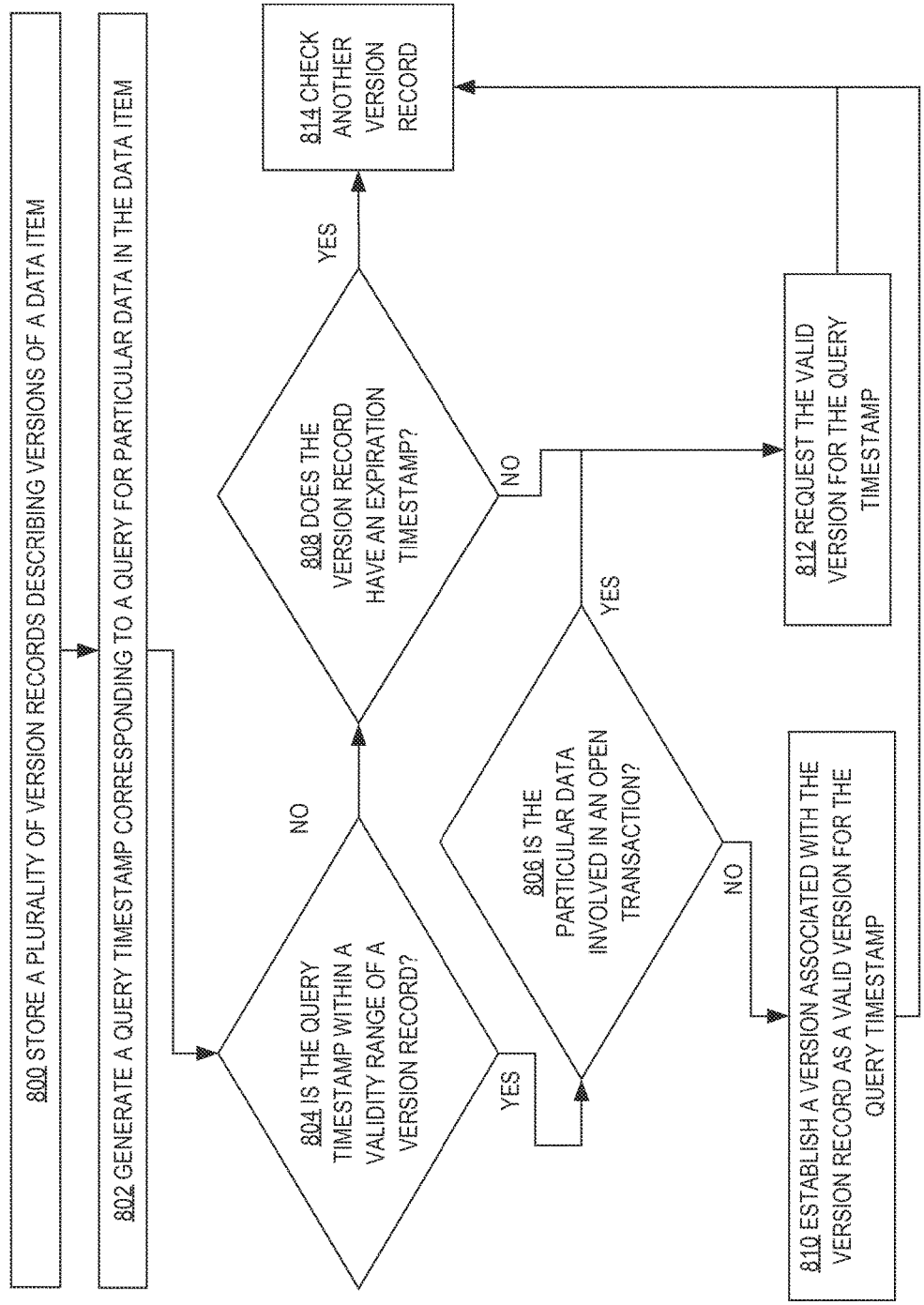
FIG. 8 is a flow diagram that depicts an approach for version control based on a dual-range validity model.

FIG. 8 is a flow diagram that depicts an approach for version control based on a dual-range validity model. At block 800, a plurality of version records 108A-Z may be stored, for example, in metadata collection 600 of OLAP server 106. Each of the plurality of version records 108A-Z may describe a version of a data item. The plurality of version records 108A-Z may be generated, for example, when OLAP server 106 retrieves corresponding data blocks from OLTP server 104.

At block 802, a query timestamp may be generated, for example, at OLAP server 106. The query timestamp may correspond to a query for particular data in the data item. For example, the query may be "SELECT name, address_id FROM person" within a complex query, such as "SELECT p.address FROM (SELECT name, address_id FROM person) p INNER JOIN (SELECT id, address FROM home) h ON p.address_id=h.id WHERE p.name='Larry Ellison';".

At block 804, the query timestamp may be compared to a validity range of each of the plurality of version records 108A-Z. Metadata collection 600 may be scanned to determine which data blocks are valid versions for the query timestamp. If the query timestamp falls within a validity range of a particular version record, analysis of the particular version record proceeds to block 806. Otherwise, analysis of the particular version record proceeds to block 808.

At block 806, the particular version record is further analyzed to determine whether any open transactions associated with the particular version record involve the particular data being queried. The determination may be based on a transaction identifier associated with the query. For the previously mentioned example query, a particular version record may be checked for any unpersisted transactions involving values in the name and address_id columns of a database table. If the particular data being queried is involved in an open transaction related to the query, block 806 proceeds to block 812. Otherwise, block 806 proceeds to block 810.

At block 808, the particular version record is further analyzed to determine whether the particular version record includes an expiration timestamp. An expiration timestamp may indicate that a newer version of the data item is known and that the newer version may be a valid version for the query timestamp. If the particular version record includes an expiration timestamp, block 808 proceeds to block 814. Otherwise, block 808 proceeds to block 812.

At block 810, a data block associated with the particular version record is established as a valid version for the query timestamp. If all data blocks necessary to execute the query have been identified, block 810 may proceed to block 800 and/or 802 when a new query is received. Otherwise, block 810 proceeds to block 814.

At block 812, the valid version for the query timestamp is retrieved, for example, from OLTP server 104. The valid version may be retrieved via a special request sent to OLTP server 104. In an embodiment, OLAP server 106 may send special requests to OLTP server 104 on an as-needed basis. However, as an optimization, one or more data sets may be scanned in their entireties prior to sending any special request to OLTP server 104. The scanning may be performed in a single, parallelized pass. Thus, OLAP server 106 may generate a set of all special requests related to the one or more data sets. The set of all special requests may be send in its entirety as a batch request to OLTP server 104. The batch request may reduce a communication overhead related to sending multiple special requests. Additionally or alternatively, the batch request may reduce a context switching overhead based on allowing an efficient running of other queries while waiting for response data from OLTP server 104.

Valid versions may be stored at OLAP server 106 in a private store. The private store may be different from the main store and the auxiliary store. The private store may store data blocks until the query completes. The private store may store data blocks that are private to a specific transaction. Additionally or alternatively, the private store may store data blocks for which OLAP server 106 is unable to determine open transactions 200, for example, when a data block is reconstructed for a point in time in the past. Existence of the valid version in the private store may be indicated by a special data block called an invalid block that is stored in the main store or the auxiliary store.

If all data blocks necessary to execute the query have been identified, block 812 may proceed to block 800 and/or 802 when a new query is received. Otherwise, block 812 proceeds to block 814.

At block 814, another version record may be analyzed to determine whether it is valid for the query timestamp. Thus, block 814 may proceed to block 804.

Approach for Query Execution on Data Sets

In an embodiment, a particular data set that is valid for a particular query may be constructed prior to executing the particular query. Information necessary to construct the particular data set may be stored in a data structure called a relation accessor. The relation accessor may include metadata relative to the particular query. Different queries may be associated with different relation accessors. Each relation accessor may include a transaction identifier, a query timestamp, a starting unit mapping (discussed below), a private store, and/or a reference to an immediately subsequent relation accessor. Relation accessors may be deleted when query execution is complete.

Relation accessors may be used to enforce consistent execution. Multiple queries corresponding to different query timestamps may concurrently read a particular data set so long as locations of data blocks remain unchanged. Additionally or alternatively, relative locations of data blocks may be maintained in such a manner that the data blocks are consistently read in a same sequence by a relation accessor. The same sequence may be an order in which the data blocks are added to the main store and/or the auxiliary store. When a relation accessor encounters an invalid block, a corresponding valid version may be read from the private store.

Consistently and/or uniquely referencing individual data units for all queries may involve assigning identifiers to individual data units. Thus, a reading location may be based on logical identifiers called unit identifiers that remain unchanged for a particular query at least while the particular query is being executed. Unit identifiers may reference physical sequential locations in memory. For example, if a particular data block includes two rows, the particular data block may be divided into two units that are numbered with sequential unit identifiers, such as unit identifier 1 and unit identifier 2. Each query may read a particular data set by following a specific sequence of data blocks that is reflected in a corresponding sequence of unit identifiers.

In an embodiment, numberings of unit identifiers may differ from query to query, so unit identifiers may be maintained in such a manner that they remain unstored by data blocks. Prior to execution of a particular query, data blocks that are valid for the particular query may be numbered with unit identifiers. For example, starting with a first valid unit of a first valid data block for a particular query, data blocks in the main store, auxiliary store, and/or private store may be numbered with sequential unit identifiers. Data blocks in the private store may be numbered in accordance with corresponding invalid blocks in the main store.

In an embodiment, a starting unit mapping may be used to reduce a time complexity of searching for a particular unit identifier. The starting unit mapping may store unit identifiers corresponding to a first valid unit in each memory allocation unit (e.g., data chunk) for a particular query. To adjust for memory usage, the starting unit mapping may store unit identifiers corresponding to a first valid unit in every $n^{th}$ memory allocation unit for a particular query, where n is determined based on the memory usage. Thus, instead of linearly scanning all the unit identifiers for a match, the starting unit mapping may be scanned to find a particular memory allocation unit that contains the particular unit identifier, and the particular memory allocation unit may be subsequently scanned to find the particular unit identifier.

Additionally or alternatively, the starting unit mapping may enable compaction even while queries are running so long as a relative order of data blocks that are not removed is maintained. Thus, despite a loss of a data chunk identifier caused by merging multiple data chunks into a single data chunk, updating the starting unit mapping accordingly may enable consistent execution of queries during compaction.

In an embodiment, unit identifiers may correspond to a metric for the quantity of data stored in data blocks. For example, if the quantity of data stored in data blocks is measured in rows, unit identifiers may be logical row identifiers. Note that the logical row identifiers may be unrelated to row identifiers of a database table, because a same row identifier may appear multiple times in multiple versions. Thus, the numbering may be performed based on scanning metadata collection 600 instead of scanning each unit of the data blocks.

Database Management Systems

In an embodiment, OLTP server 104 and OLAP server 106 may each be a DBMS (Database Management System). A DBMS includes at least one database server that manages a database. Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises a database dictionary. A database dictionary comprises metadata that defines database objects physically or logically contained in a database. In effect, a database dictionary defines the totality of a database. Database objects include tables, indexes, views, columns, data types, users, user privileges, and storage structures, such as table spaces, which are used for storing database object data.

Application clients interact with a database server to access data in the database managed by the database server. Clients access the database data by submitting to the database server commands that cause the database server to perform operations on data stored in a database. A database command may be in the form of a database statement that conforms to a database language, such as the Structured Query Language (SQL). There are many different versions of SQL, some versions are standard, and some proprietary, and there are a variety of extensions. Data manipulation language ("DML") statements are issued to a database server to query or request changes to a database. Data definition language ("DDL") instructions are issued to a database server to create or configure database objects, such as tables, views, or complex data types, or to control how DML statements are to be processed.

A DBMS may be transaction-oriented. A transaction-oriented DBMS changes data in a database in an ACID compliant manner through execution of transactions. ACID (Atomicity, Consistency, Isolation, Durability) is a set of properties that guarantee that database transactions are processed reliably. Atomicity requires that each transaction is all or nothing; if any part of the transaction fails, then the database state should not be changed by the transaction.

A transaction is a set of operations that change database data. In a DBMS, the operations are specified by one or more database commands. Committing a transaction refers to making the changes for a transaction permanent. Under transaction processing, all the changes for a transaction are made atomically.

Once a transaction is initiated, a transaction is either committed or aborted. When a transaction is committed, all changes in the transaction are made permanent. When aborted, the transaction changes are rolled back. A terminated transaction is a transaction for which the operation of committing or aborting has been completed. Completing the operation of committing a transaction or aborting a transaction may include releasing locks on database objects, such as rows, that are held by the transaction.

A data block is a unit of persistent storage and is used by a DBMS to store one or row more database rows, or portions of rows, including one or more columns of a row. When rows are read from persistent storage, a data block containing the row is copied into a data block buffer in volatile and/or main memory of a database server. A data block usually contains multiple rows and data block metadata describing the contents of the data block. Metadata includes control and formatting information, such as offsets to sequences of bytes representing rows or other data structures, and a list of transactions affecting a row.

A data block is referred to as being atomic because, at least in part, a data block is the smallest unit of database data a database server may request from a persistent storage device. For example, when a database server seeks a row that is stored in a data block, the data block may only read the row from a persistent storage device by reading in the entire data block.

A data block is associated with a data block address that uniquely identifies the data block and the data block's storage location within a storage device. A database server may request from a storage device a data block by data block address, or even by primary block address ranges of data blocks.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
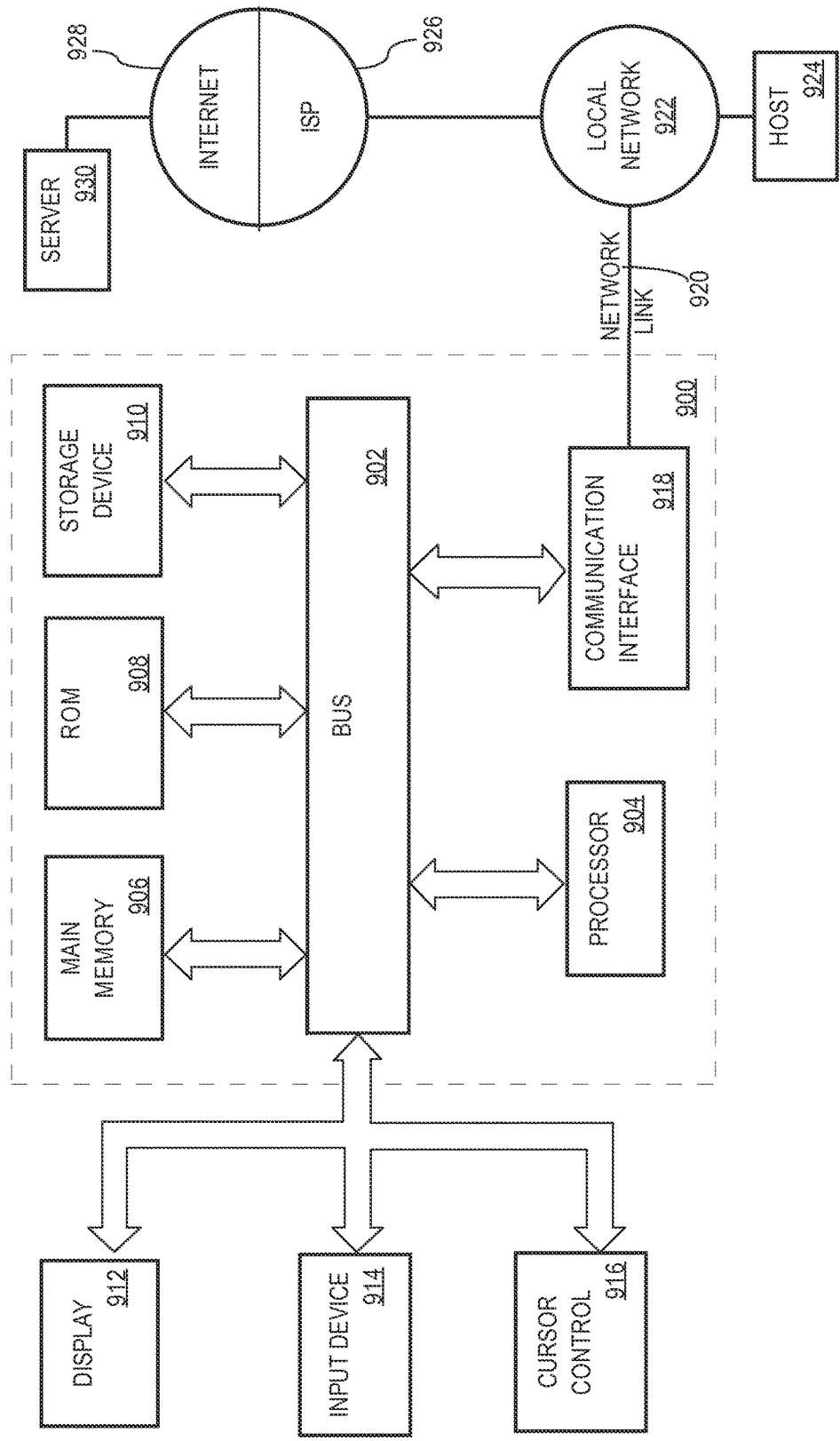
FIG. 9 depicts a computer system upon which an embodiment may be implemented.

For example, FIG. 9 is a block diagram that depicts a computer system 900 upon which an embodiment may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
    storing a plurality of version records describing versions of a data item, a version record of said plurality of version records:
        describing any open transactions for a version of said data item;
        specifying a commit timestamp for said data item at a database and a valid timestamp at least as great as said commit timestamp, said commit timestamp and said valid timestamp specifying a validity range;
        specifying an expiration timestamp, said valid timestamp and said expiration timestamp specifying an unresolved range;
    identifying a valid version of said data item for a query timestamp, said query timestamp corresponding to a query for particular data in said data item and falling within either said validity range or said unresolved range:
        when said query timestamp is within said validity range and said particular data is uninvolved in said any open transactions, establishing said version as said valid version for said query timestamp,
        when said query timestamp is within said validity range and said particular data is involved in at least one open transaction of said any open transactions, requesting, from a transaction-oriented data server of said database, said valid version for said query timestamp, and
        when said query timestamp is within said unresolved range, requesting, from said transaction-oriented data server of said database, said valid version for said query timestamp,
    wherein said method is performed by one or more computing devices.

2. The method of claim 1, further comprising extending, when said query timestamp is within said unresolved range and said version of said data item is identified as said valid version for said query timestamp, said validity range to encompass said query timestamp, which becomes said valid timestamp.

3. The method of claim 1, further comprising reducing, when said query timestamp is within said unresolved range and a different version of said data item is identified as said valid version for said query timestamp, said expiration timestamp to be synchronized with a different commit timestamp of said different version.

4. The method of claim 1, further comprising requesting, when a particular query timestamp is greater than a most recent query timestamp of a current version of said data item, a new version of said data item for said particular query timestamp from said transaction-oriented data server of said database.

5. The method of claim 4, further comprising storing, in digital memory, a pointer to said current version of said data item.

6. The method of claim 1, further comprising completely deleting said version when said expiration timestamp is less than a deletion timestamp.

7. The method of claim 6, further comprising deleting, when said expiration timestamp is less than or equal to a compaction timestamp, data associated with said version without deleting said version record.

8. One or more non-transitory storage media storing sequences of instructions which, when processed by one or more computing devices, cause:
  storing a plurality of version records describing versions of a data item, a version record of said plurality of version records:
    describing any open transactions for a version of said data item;
    specifying a commit timestamp for said data item at a database and a valid timestamp at least as great as said commit timestamp, said commit timestamp and said valid timestamp specifying a validity range;
    specifying an expiration timestamp, said valid timestamp and said expiration timestamp specifying an unresolved range;
  identifying a valid version of said data item for a query timestamp, said query timestamp corresponding to a query for particular data in said data item and falling within either said validity range or said unresolved range:
    when said query timestamp is within said validity range and said particular data is uninvolved in said any open transactions, establishing said version as said valid version for said query timestamp,
    when said query timestamp is within said validity range and said particular data is involved in at least one open transaction of said any open transactions, requesting, from a transaction-oriented data server of said database, said valid version for said query timestamp, and
    when said query timestamp is within said unresolved range, requesting, from said transaction-oriented data server of said database, said valid version for said query timestamp.

9. The one or more non-transitory storage media of claim 8, wherein said sequences of instructions further include instructions that, when executed by one or more processors, cause extending, when said query timestamp is within said unresolved range and said version of said data item is identified as said valid version for said query timestamp, said validity range to encompass said query timestamp, which becomes said valid timestamp.

10. The one or more non-transitory storage media of claim 8, wherein said sequences of instructions further include instructions that, when executed by one or more processors, cause reducing, when said query timestamp is within said unresolved range and a different version of said data item is identified as said valid version for said query timestamp, said expiration timestamp to be synchronized with a different commit timestamp of said different version.

11. The one or more non-transitory storage media of claim 8, wherein said sequences of instructions further include instructions that, when executed by one or more processors, cause requesting, when a particular query timestamp is greater than a most recent query timestamp of a current version of said data item, a new version of said data item for said particular query timestamp from said transaction-oriented data server of said database.

12. The one or more non-transitory storage media of claim 11, wherein said sequences of instructions further include instructions that, when executed by one or more processors, cause storing, in digital memory, a pointer to said current version of said data item.

13. The one or more non-transitory storage media of claim 8, wherein said sequences of instructions further include instructions that, when executed by one or more processors, cause completely deleting said version when said expiration timestamp is less than a deletion timestamp.

14. The one or more non-transitory storage media of claim 13, wherein said sequences of instructions further include instructions that, when executed by one or more processors, cause deleting, when said expiration timestamp is less than or equal to a compaction timestamp, data associated with said version without deleting said version record.

15. A method of an online analytical processing (OLAP) server comprising:
  storing a plurality of version records describing versions of a data item, a version record of said plurality of version records:
    describing any open transactions for a version of said data item;
    specifying a commit timestamp for said data item at a database and a valid timestamp at least as great as said commit timestamp, said commit timestamp and said valid timestamp specifying a validity range;
    specifying an expiration timestamp, said valid timestamp and said expiration timestamp specifying an unresolved range;
  identifying a valid version of said data item for a query timestamp, said query timestamp corresponding to a query for particular data in said data item and falling within either said validity range or said unresolved range:
    when said query timestamp is within said validity range and said particular data is uninvolved in said any open transactions, establishing said version as said valid version for said query timestamp,
    when said query timestamp is within said validity range and said particular data is involved in at least one open transaction of said any open transactions, requesting, from a transaction-oriented data server of said database, said valid version for said query timestamp, and
    when said query timestamp is within said unresolved range, requesting, from said transaction-oriented data server of said database, said valid version for said query timestamp.

16. The method of claim 15, further comprising extending, when said query timestamp is within said unresolved range and said version of said data item is identified as said valid version for said query timestamp, said validity range to encompass said query timestamp, which becomes said valid timestamp.

17. The method of claim 15, further comprising reducing, when said query timestamp is within said unresolved range and a different version of said data item is identified as said valid version for said query timestamp, said expiration timestamp to be synchronized with a different commit timestamp of said different version.

18. The method of claim 15, further comprising requesting, when a particular query timestamp is greater than a most recent query timestamp of a current version of said data item, a new version of said data item for said particular query timestamp from said transaction-oriented data server of said database.

19. The method of claim 18, further comprising storing, in digital memory, a pointer to a current version of said data item.

20. The method of claim 15, further comprising:
completely deleting said version when said expiration timestamp is less than a deletion timestamp; and
deleting, when said expiration timestamp is less than or equal to a compaction timestamp, data associated with said version without deleting said version record.

* * * * *

UNITED STATES PATENT AND TRADEMARK OFFICE
CERTIFICATE OF CORRECTION

PATENT NO. : 9,811,560 B2  
APPLICATION NO. : 14/824920  
DATED : November 7, 2017  
INVENTOR(S) : Di Blas et al.

Page 1 of 1

It is certified that error appears in the above-identified patent and that said Letters Patent is hereby corrected as shown below:

On the Title Page

Column 2, under Other Publications, Line 2, delete "28th 28th" and insert -- 28th --, therefor.

In the Specification

In Column 5, Line 56, delete "timstamps)." and insert -- timestamps). --, therefor.

Signed and Sealed this  
Twenty-sixth Day of June, 2018

Andrei Iancu  
*Director of the United States Patent and Trademark Office*